United States Patent
Bailey et al.

(10) Patent No.: US 10,306,315 B2
(45) Date of Patent: May 28, 2019

(54) VIDEO STREAMING AUGMENTING

(71) Applicant: INTERNATIONAL BUSINESS MACHINES CORPORATION, Armonk, NY (US)

(72) Inventors: Matthew C. Bailey, Hursley (GB); Andrew J. Daniel, Hursley (GB); Philip Jones, Hursley (GB); Richard W. Pilot, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 290 days.

(21) Appl. No.: 15/083,545

(22) Filed: Mar. 29, 2016

(65) Prior Publication Data

US 2017/0289623 A1 Oct. 5, 2017

(51) Int. Cl.
*H04N 21/475* (2011.01)
*H04N 21/4545* (2011.01)
(Continued)

(52) U.S. Cl.
CPC ......... *H04N 21/4542* (2013.01); *G06F 3/011* (2013.01); *G06F 3/017* (2013.01);
(Continued)

(58) Field of Classification Search
CPC ...................................................... G06F 3/011
(Continued)

(56) References Cited

U.S. PATENT DOCUMENTS 6,822,648 B2 11/2004 Furlong et al.
7,783,075 B2 8/2010 Zhang et al.
(Continued)

FOREIGN PATENT DOCUMENTS

CN 1767638 A 5/2006

OTHER PUBLICATIONS

Cuthbertson, A., "Brand Killer: Augmented Reality Goggles Create Real-World AdBlock", International Business Times, (http://www.ibtimes.co.uk/brand-killer-augmented-reality-goggles-create-real-world-adblock-1484844) published Jan. 23, 2015 (2 pages).
(Continued)

*Primary Examiner* — Javid A Amini
(74) *Attorney, Agent, or Firm* — Richard Wilhelm, Esq.; Kevin P. Radigan, Esq.; Heslin Rothenberg Farley & Mesiti P.C.

(57) ABSTRACT

Augmenting a video stream of an environment is provided, the environment containing a private entity to be augmented. Video of the environment is processed in accordance with an entity recognition process to identify the presence of at least part of an entity in the environment. It is determined whether the identified entity is to be augmented based on information relating to the identified entity and the private entity. Based on determining that the identified entity is to be augmented, the video stream is modified to replace at least a portion of the identified entity with a graphical element adapted to obscure the portion of the identified entity in the video stream. By modifying the video stream to obscure an entity, private or personal information in the environment may be prevented from being displayed to a viewer of the video stream.

15 Claims, 7 Drawing Sheets

(51) Int. Cl.

| | |
|---|---|
| *H04L 29/06* | (2006.01) |
| *H04N 21/454* | (2011.01) |
| *H04N 21/2187* | (2011.01) |
| *G06F 3/01* | (2006.01) |
| *G06T 17/00* | (2006.01) |
| *G06T 19/00* | (2011.01) |
| *G06T 15/00* | (2011.01) |
| *G06K 9/00* | (2006.01) |
| *G06K 9/78* | (2006.01) |
| *G06T 19/20* | (2011.01) |
| *G06K 9/62* | (2006.01) |
| *H04N 21/431* | (2011.01) |
| *G02B 27/01* | (2006.01) |
| *G02B 27/00* | (2006.01) |
| *G06T 7/70* | (2017.01) |
| *H04N 21/81* | (2011.01) |

(52) U.S. Cl.
CPC ..... *G06K 9/00201* (2013.01); *G06K 9/00624* (2013.01); *G06K 9/00664* (2013.01); *G06K 9/00671* (2013.01); *G06K 9/6201* (2013.01); *G06K 9/78* (2013.01); *G06T 15/00* (2013.01); *G06T 17/00* (2013.01); *G06T 19/00* (2013.01); *G06T 19/006* (2013.01); *G06T 19/20* (2013.01); *H04L 65/602* (2013.01); *H04L 67/38* (2013.01); *H04N 21/2187* (2013.01); *H04N 21/4318* (2013.01); *H04N 21/4545* (2013.01); *H04N 21/475* (2013.01); *G02B 27/0093* (2013.01); *G02B 2027/0138* (2013.01); *G02B 2027/0187* (2013.01); *G06T 7/70* (2017.01); *G06T 2200/08* (2013.01); *G06T 2219/00* (2013.01); *G06T 2219/20* (2013.01); *H04N 21/8146* (2013.01)

(58) Field of Classification Search
USPC ........................................................ 345/633
See application file for complete search history.

(56) References Cited

U.S. PATENT DOCUMENTS

| | | | | |
|---|---|---|---|---|
| 8,311,275 B1* | 11/2012 | Berlic | ............... | G06K 9/00771 348/143 |
| 8,316,237 B1* | 11/2012 | Felsher | ............... | H04L 9/0825 380/282 |
| 9,536,154 B2* | 1/2017 | Skans | ............... | G06K 9/6201 |
| 9,642,536 B2* | 5/2017 | Kashef | ............... | G06F 19/3418 |
| 2006/0082438 A1* | 4/2006 | Bazakos | ............... | G06K 9/00255 340/5.82 |
| 2008/0013837 A1* | 1/2008 | Porter | ............... | G06K 9/00248 382/218 |
| 2010/0290756 A1* | 11/2010 | Karaoguz | ............... | G06Q 30/0637 386/239 |
| 2011/0038512 A1* | 2/2011 | Petrou | ............... | G06F 17/30256 382/118 |
| 2011/0096991 A1* | 4/2011 | Lee | ............... | G06T 11/60 382/173 |
| 2011/0158470 A1* | 6/2011 | Martin | ............... | H04N 19/647 382/100 |
| 2011/0216179 A1* | 9/2011 | Dialameh | ............... | G06F 17/30247 348/62 |
| 2012/0081529 A1* | 4/2012 | Seo | ............... | G06T 19/006 348/61 |
| 2012/0320216 A1* | 12/2012 | Mkrtchyan | ............... | H04N 5/33 348/164 |
| 2013/0294642 A1* | 11/2013 | Wang | ............... | G06F 17/30855 382/103 |
| 2014/0226900 A1* | 8/2014 | Saban | ............... | G02B 5/08 382/165 |
| 2014/0247281 A1* | 9/2014 | Ellenby | ............... | G06T 19/006 345/633 |
| 2015/0098616 A1* | 4/2015 | Gervautz | ............... | G06K 9/00624 382/103 |
| 2015/0104061 A1 | 4/2015 | Heikkinen et al. | | |
| 2015/0244987 A1* | 8/2015 | Delegue | ............... | H04N 7/157 348/14.09 |
| 2015/0260474 A1* | 9/2015 | Rublowsky | ............... | F41A 33/00 434/16 |
| 2015/0373385 A1* | 12/2015 | Straub | ............... | H04N 21/23412 725/34 |
| 2016/0026253 A1* | 1/2016 | Bradski | ............... | G02B 27/225 345/8 |
| 2016/0148304 A1* | 5/2016 | Srinath | ............... | G06Q 30/0641 705/27.1 |
| 2016/0191995 A1* | 6/2016 | el Kaliouby | ............... | A61B 5/165 725/12 |
| 2016/0210998 A1* | 7/2016 | Leske | ............... | G06T 11/60 |
| 2016/0299563 A1* | 10/2016 | Stafford | ............... | G06F 17/30867 |
| 2017/0103558 A1* | 4/2017 | Sharma | ............... | G06T 11/60 |
| 2017/0212875 A1* | 7/2017 | Foresti | ............... | G06F 3/0482 |
| 2017/0372526 A1* | 12/2017 | Groten | ............... | G06K 9/00671 |

OTHER PUBLICATIONS

Notification, International Search Report (ISR) & Written Opinion for PCT/IB2017/050371, dated May 2, 2017 (12 pages).

* cited by examiner

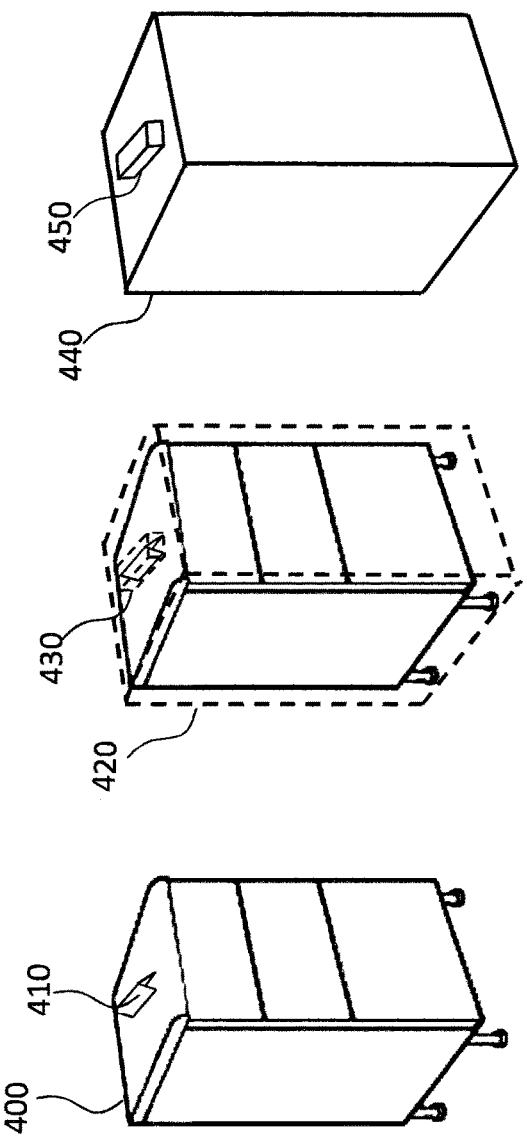

VIDEO STREAMING AUGMENTING

BACKGROUND

The present invention relates to the field of augmenting a video stream, and more particularly, to augmenting a video stream of an environment containing private information.

Devices that can be used to capture video of an environment are widely known and available. It is also known to adapt or use such video capture devices to augment a user experience of an environment, for example by augmenting a live video-stream of an environment with additional display information.

Known devices or systems that aim to augment a user's experience by displaying video stream of an environment include: Virtual Reality (VR) head-mounted display system; smartphone-based Augmented Reality (AR) systems, Hololens®, Oculus Rift®, and the like.

Many of these devices and systems are adapted to be able to share a user's view with a second viewer. A video stream displayed to a user of a VR head-mounted display system may therefore be shared with another person so that the other person can see what the user (that is, wearer of the VR head-mounted display) is seeing. The sharing of the video may be implemented via an IP-based video call, a dedicated video communication link, or a video broadcast channel, for example. Thus, such use examples may include a user potentially enabling un-trusted third-parties to view the shared video.

SUMMARY

In one or more aspects, a computer-implemented method of augmenting a video stream of an environment is provided. The environment contains a private entity to be augmented, and the method includes: processing the video stream in accordance with an entity recognition process to identify the presence of at least part of an entity in the environment; generating identified entity information relating to at least one property of the identified entity; determining whether the identified entity is to be augmented based on the generated identified entity information and private entity information relating to the private entity; and based on determining that the identified entity is to be augmented, modifying the video stream to replace at least a portion of the identified entity with a graphical element adapted to obscure the portion of the identified entity in the video stream.

In one or more additional aspects, a computer program product is provided for augmenting a video stream of an environment. The environment contains a private entity to be augmented, and the computer program product includes a computer readable storage medium having program instructions embodied therewith, the program instructions being executable by a processing unit to cause the processing unit to perform a method comprising: processing the video stream of the environment in accordance with an entity recognition process to identify the presence of at least part of an entity in the environment; generating identified entity information relating to at least one property of the identified entity; determining whether the identified entity is to be augmented based on the generated identified entity information and private entity information relating to the private entity; and based on determining that the identified entity is to be augmented, modifying the video stream to replace at least a portion of the identified entity with a graphical element adapted to obscure the portion of the identified entity in the video stream.

In one or more further aspects, an augmentation system is provided for augmenting a video stream of an environment. The environment contains a private entity to be augmented, and the system comprises a memory, and a processor communicatively coupled to the memory. The system performs a method comprising: processing the video stream in accordance with an entity recognition process to identify the presence of at least part of an entity in the environment; generating identified entity information relating to at least one property of the identified entity; determining whether the identified entity is to be augmented based on the generated identified entity information and private entity information relating to the private entity; and based on determining that the identified entity is to be augmented, modifying the video stream to replace at least a portion of the identified entity with a graphical element adapted to obscure the portion of the identified entity in the video stream.

BRIEF DESCRIPTION OF THE DRAWINGS

Embodiments of the present invention are described below, by way of example only, with reference to the drawings, in which:

FIGS. 4A-4C illustrate how a proposed embodiment may augment not only a private object but another object positioned on the private object, in accordance with one or more aspects of the present invention;

DETAILED DESCRIPTION

Figure 1:
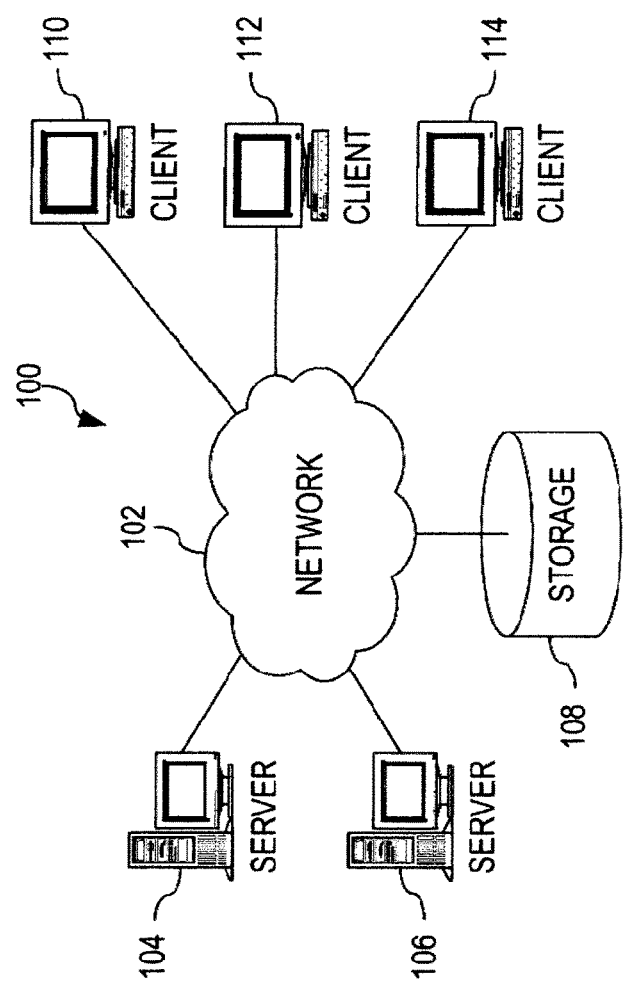
FIG. 1 depicts a pictorial representation of an example distributed system, in which one or more aspects of the present invention may be implemented.

It should be understood that the figures are merely schematic and are not drawn to scale. It should also be understood that the same reference numerals used throughout different figures designate the same or similar parts.

In examples of a video being communicated (for instance, transmitted, sent or broadcast) to potentially un-trusted third-parties, the videoed environment may contain information, objects, entities, items, etc. that the user does not wish to be broadcast (for example, viewed by un-trusted or unknown third-parties). For example, while a user may be happy to share, via video, their view of a broken pipe to a remotely located plumbing engineer, or to show their home interior to a group of interested people, the user may not wish to share a view of confidential/sensitive paperwork on their desk for example. However, given the nature of providing the necessary view(s) via a video, it may be inevitable that the confidential/sensitive paperwork will be visible in the video (and thus visible to a viewer of the video).}

Post-processing a video to blur-out portions of video that a content-creator does not wish a viewer of the video to see is known. However, such post-processing concepts and techniques require the control or input of a content-creator (for example, editor) after the video has been created. They also typically require labor/input-intensive resources to process the video before it can be communicated for viewing. Thus, existing post-processing techniques incur significant processing resources and time-delays.

Disclosed herein is a concept for hiding private or confidential information in a video stream of an environment containing the private or confidential information. In this way, the video stream of the environment may be augmented so that so it can be viewed by an untrusted $3^{rd}$-party while maintaining the privacy or confidentiality of the information in the viewed video.

By enabling private objects or entities to be defined in an environment, a live video stream of the environment may then be processed (in real-time) to determine if the live video stream contains an object/entity to be augmented (such as the private object itself or an object having a predetermined special relationship with the private object). Embodiments may therefore enable a user to capture and share a live video stream of an environment (such as a room, enclosed space, commercial or residential building, or personal dwelling) safe in the knowledge that private/confidential information will be augmented from the view in the shared video (which may be viewed by an untrusted $3^{rd}$ party for example).

Furthermore, embodiments may enable real-time augmenting of a live video-stream provided to a public audience, wherein the public audience is prevented from seeing particular items (such as private/confidential items or documents for example) in the displayed video-stream.

For instance, one or more aspects of the present invention may enable live video to be captured and broadcast to remote users and, depending on a viewer's authentication privileges or trustworthiness, certain private information in the environment may be selectively displayed or obscured in the viewed video.

Illustrative embodiments may therefore provide concepts for privacy zones or areas within an environment used in an augmented reality system/method.

Such concepts may provide for the generation of an augmented video stream in an automated manner. Any video processing system could be used with the proposed concept, but is may be preferable for such a system to exhibit at least one of the following qualities: augmented reality processing capabilities; 3D spatial tracking capabilities; entity recognition; virtual reality capabilities; video capture abilities; and video communication abilities.

Modifications and additional steps to a traditional video capture and transmission system are also disclosed which may enhance the value and utility of the proposed concepts.

Reference to a private entity may be taken to refer to any object, entity, area, surface, or item that may contain or display information that may be provide, confidential or sensitive in nature, such as text, images, alphanumeric characters, logos, names, documents, files, shapes, keys, codes, passwords, dates, locations, etc.

Figure 2:
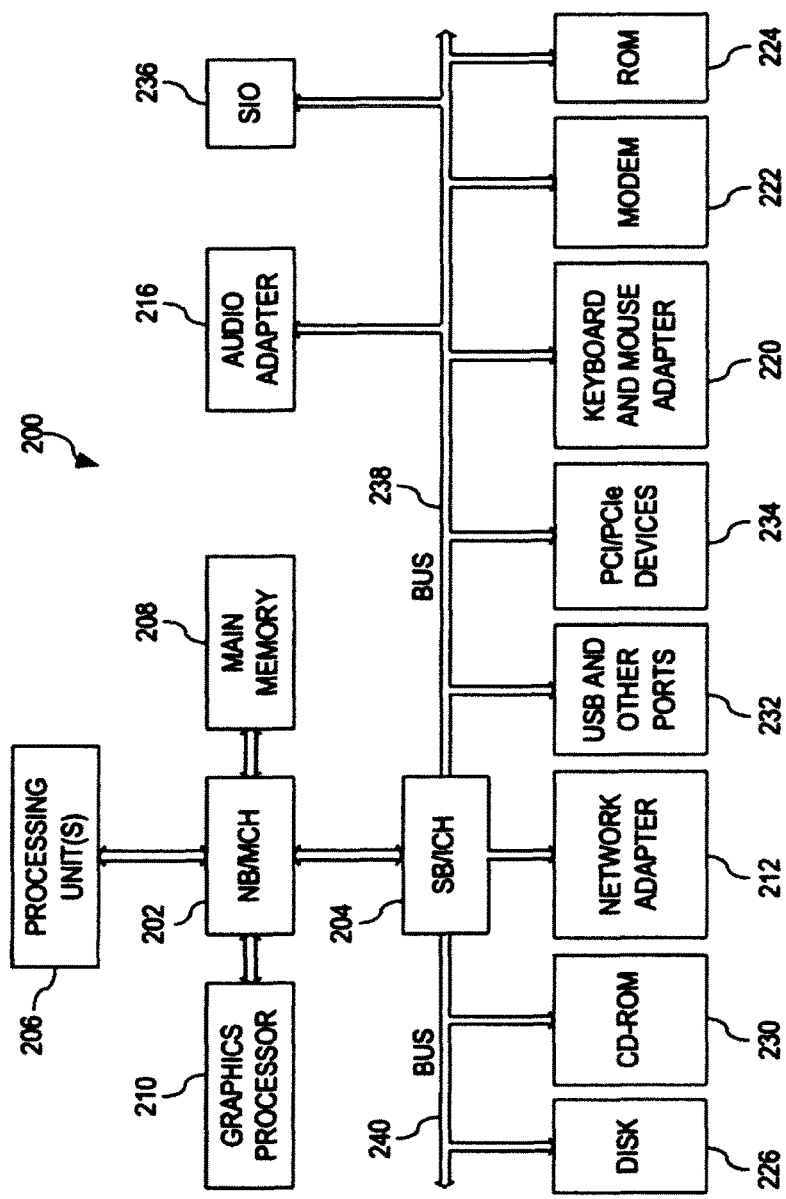
FIG. 2 is a block diagram of an example video processing system, in which one or more aspects of the present invention may be implemented.

Illustrative embodiments may be utilized in many different types of data or video processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be, for example, personal computers, network computers, smartphones, video capture devices, digital imaging devices, portable cameras, Oculus Rift® devices, VR devices, or the like. In the depicted example, the first server 104 provides data, such as boot files, operating system images, and applications to the clients 110, 112, and 114. Clients 110, 112, and 114 are clients to the first server 104 in the depicted example. The distributed prediction system 100 may include additional servers, clients, and other devices not shown.

In the depicted example, the distributed system 100 may be the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, comprising thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a portable computing device, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java® programming system, may run in conjunction with the operating system and provides calls to the operating system from Java programs or applications executing on system 200. Java and all Java-based trademarks and logos are trademarks or registered trademarks of Oracle and/or its affiliates.

As a server, system 200 may be, for example, an IBM® System p5® computer system, running the Advanced Interactive Executive (AIX®) operating system or the Linux® operating system. The system 200 may be a symmetric multiprocessor (SMP) system including a plurality of processors in processing unit 206. Alternatively, a single processor system may be employed. IBM, eServer, System p5 and AIX are trademarks of International Business Machines Corporation, registered in many jurisdictions worldwide. Linux is a registered trademark of Linus Torvalds in the United States, other countries, or both.

Instructions for the operating system, the object-oriented programming system, and applications or programs are located on storage devices, such as HDD 226, and may be loaded into main memory 208 for execution by processing unit 206. Similarly, one or data structures according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as first bus 238 or second bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as 3D spatial tracking devices, video capture devices, positioning systems, accelerometer arrangement, equivalent non-volatile memory, or optical disk drives and the like, may be used in addition to or in place of the hardware depicted in FIGS. 1 and 2. Also, the processes of the illustrative embodiments may be applied to a multiprocessor data or video processing system, other than the system mentioned previously, without departing from the scope of the proposed embodiments.

Moreover, the system 200 may take the form of any of a number of different data or video processing systems including client computing devices, server computing devices, a tablet computer, laptop computer, smart (e.g. internet-enabled) television or display, smartphone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

One or more aspects of the present invention may enhance a video capture or display system by providing for automatic and dynamic augmenting of a video stream. Embodiments may enable private or confidential information in a videoed environment to be augmented from view in the captured video. Such augmentation concepts can be applied to live video streams thus enabling real-time augmenting of live video broadcast, and, in some embodiments, such augmenting may be adapted according to individual viewers of the video stream.

Figure 3:
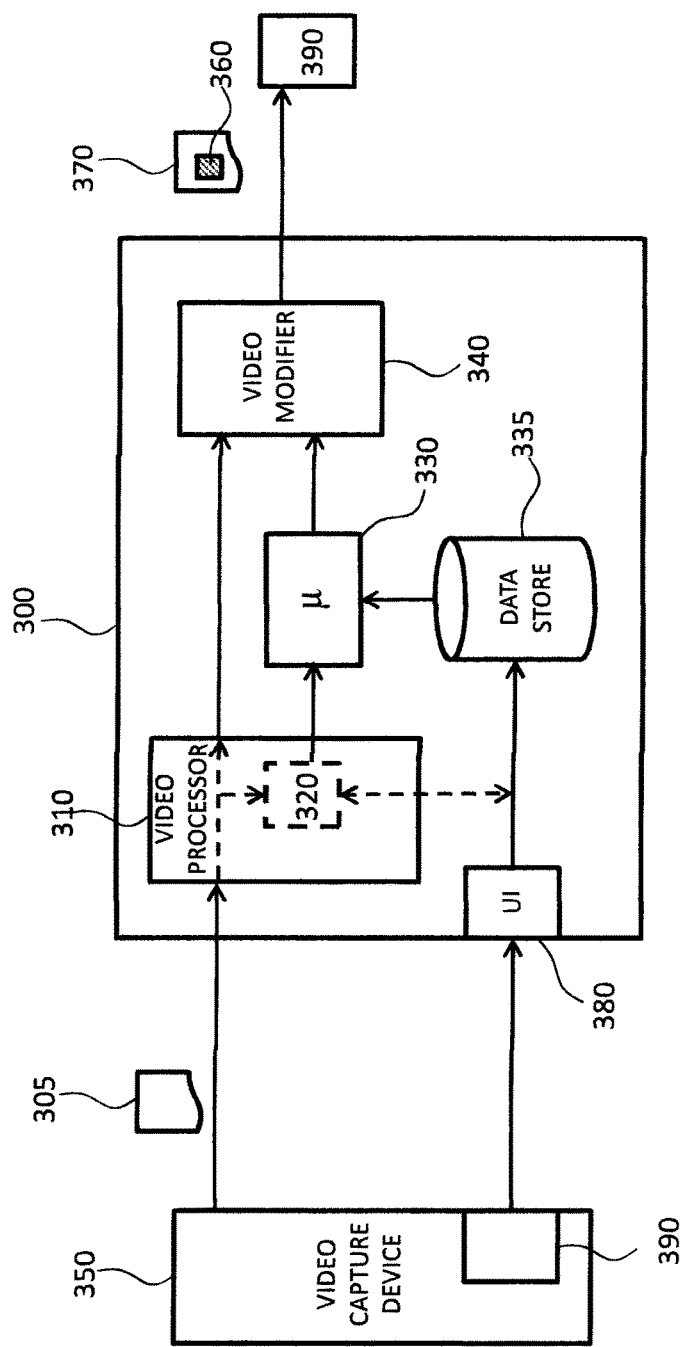
FIG. 3 is a simplified block diagram of an example augmentation system, in accordance with one or more aspects of the present invention.

FIG. 3 is a simplified block diagram of an example augmentation system 300 according to a proposed embodiment. The augmentation system 300 is adapted to provide for augmenting of a video 305 of an environment, wherein the environment contains a private entity (e.g. confidential item or secret object) that a user wishes to be augmented (e.g. obscured, hidden, or concealed) from view within the video.

The system 300 comprises a video processing unit 310 having an information generator 320. The system 300 also comprises a data processing unit 330, a data store 335 and a video modification unit 340.

The video processing unit 310 is adapted to process a video stream 305 of the environment (received from a video capture device 350, for example) in accordance with an entity recognition algorithm to identify the presence of at least part of an entity in the environment. In this regard, it is noted that there already exist many different ways to identify and track an entity in a video stream may be employed by embodiments, some of which are already widely known and employed in video capture, virtual reality and augmented reality systems. Accordingly, detailed description of such methods for identifying and tracking entities (such as object, items, persons, areas) in the received video stream is omitted from the description. However, purely by way of example, entity recognition algorithms that may be employed by the video processing unit 310 include: color matching algorithms, phase detection algorithms, edge detection algorithms, contrast detection algorithms, face recognition algorithms, 3D spatial tracking algorithms such as those provided by Hololens™ raw data. Other known products and software may also be employed, such as the Microsoft™ Kinect™ and the Leap Motion™. Other such algorithms and products include "Sync 3D", "Asus Xtion Pro", algorithms in edge detection, or algorithms for 3D object detection in 2D video.

The information generator 320 is then adapted to generate identified entity information relating to at least one property of the identified entity. By way of example, such identified entity information may include the following information: viewing direction information representative of a viewing direction of a video capture device 350; viewing position information representative of a position of the video capture device 350; identified entity location information representative of a location of the identified entity; identified entity orientation information representative of an orientation of the identified entity; identified entity geometric information representative of at least one geometric property of the identified entity; identified entity color information representative of at least one color of the identified entity; and identified entity 3D coordinate information representative of a position of the identified entity in a 3D coordinate space. Thus, the information generator 320 may enable an object or entity that is identified in an environment by the video processing unit 310 to be described using a wide variety of information which enables a high degree of flexibility or accuracy in analyzing the identified entity against predetermined constraints, measures, validation parameters, etc.

The information generator 320 is adapted to provide the generated identified entity information to the data processing unit 330.

The data processing unit 330 is adapted to determine if the identified entity is to be augmented from the video or not. To make this determination, the data processing unit uses the generated identified entity information and private entity information relating to the private entity (which is stored in the data store 335).

By way of example, the private entity information may comprise at least one of: private entity location information representative of a location of the private entity; private entity orientation information representative of an orientation of the private entity; private entity geometric information representative of at least one geometric property of the private entity; private entity color information representative of at least one color of the private entity; and private entity 3D coordinate information representative of a position of the private entity in a 3D coordinate space. Thus, a private object or entity in an environment may be described using a wide variety of information which enables a high degree of flexibility or accuracy in determining the presence of the private object/entity in a video stream of the environment.

By way of example, the data processing unit 330 may be adapted to determine if the identified entity is to be augmented by assessing if the identified entity either substantially matches the private entity or is situated in, on, under or in close proximity to the private entity. The assessment may, for example, comprise comparing the generated identified entity information and private entity information to identify matches in parameter values or properties of the identified entity and private entity. Also, differences in values may be compared against predetermined constraints, measures, threshold values, validation parameters, etc.

If the data processing unit 330 determines that the identified entity either substantially matches the private entity or is situated in, on, under or in close proximity to the private entity, it may be concluded by the data processing unit 330 that the identified entity is to be augmented. Thus, in such embodiments, there may be employed the concept of augmenting not only items that are predefined to be private, but also of augmenting items that are placed in, on, under, close-by, next-to, adjacent to, or proximate to private objects/items. For instance, a table may be defined as being a private table and any items placed on the upper surface of the table may then be treated as being private/confidential and thus augmented from a video stream.

The data processing unit 330 provides information about its conclusion(s) (e.g. the result(s) of its analysis of the identified entity information and private entity information) to the video modification unit 340.

The video modification unit 340 is also adapted to receive the video 305.

If the identified entity is determined to be augmented, the video modification unit 340 is adapted to modify the video stream to replace at least a portion of the identified entity with a graphical element 360 which obscures the portion of the identified entity in the video stream. In this way, the video modification unit 340 is adapted provides a modified (e.g. augmented) video 370. The video modification unit 340 may then output the modified video 370 for display to an unknown or un-trusted viewer (via a display unit 390 for example).

Thus, it will be understood that the system 300 of FIG. 3 may automatically and dynamically augment a video stream of an environment containing private or confidential information. It is also noted that, by leveraging predefined (e.g. stored) information about a private entity to be augmented along with information generated from the video stream 305, the system 300 may process and modify the video stream 305 in real time, so as to provide a modified (e.g. augmented) real-time (e.g. live) video stream 370 wherein confidential objects or entities of the environment which are present in the video stream 305 are replaced or obscured by graphical element or graphical effect 360, thereby preventing a viewer of the modified video stream 370 from viewing the confidential information. By processing each frame of the video stream 370, the system may track the position of a private object or entity in a video stream so that it remains blurred or masked at all times that it is within the video's view.

The modified video stream 370 may therefore be communicated (e.g. sent, or broadcast) in a live manner to remote viewers without compromising (e.g. exposing or making visible/viewable) private or confidential content in the videoed environment.

It is noted that the embodiment of FIG. 3 also comprises a user input interface 380 which is adapted to receive a user input describing a private entity to be augmented. Such user inputs may, for example, be provided to the data store 335 for subsequent storage and use as private entity information. Prior to its provision to the data store, the user inputs may be provided to the information generator 320, which then generates private entity information based on the received user input (for example, in an appropriate format for storage). A user may therefore define (e.g. tag, describe, label, etc.) objects, regions or entities within the environment that are to be augmented in a video of the environment. The user may, for example, make such definitions using an input interface 390 of the video capture device 350.

Thus, inputs from a user may be used (by the information generator 320 for example) to generate information and rules about such user-defined regions or entities, thereby enabling their identification and augmentation in a video stream of the environment. This may enable users to identify private entities in a quick and simple manner, for example by pointing and clicking, rather than requiring the user to provide detailed and/or complex information about a private entity in a specific or precise format. Proposed embodiments may therefore enable a high degree of flexibility and ease of use for a user.

The system 300 of FIG. 3 may be integrated into a video capture system, and thus may employed within virtual reality systems and/or augmented reality systems, such as Hololens®, virtual reality headsets, head-mounted display systems, Oculus Rift® systems, and the like. For instance, such systems may be adapted to capture a video of an environment containing a private object or entity and then augment the video (e.g. by obscuring a portion of the video that would otherwise display the private object/entity) prior to displaying the video to an external viewer.

However, it is to be understood that embodiments may be employed in video display systems that are adapted to display video captured of an environment. Such video may be captured using a conventional image or video capture device and this may then be supplemented using a proposed system like that of FIG. 3 so as to process the video and modify it to augment private/confidential information from the video before it is displayed to a viewer. In this way, embodiments may be implemented at a location that is different or remote from the videoed environment.

Embodiments may also be distributed at various positions throughout a video capture and display system, rather than being located at the video capture end or the video display end for example. Taking such an approach may enable processing and/or hardware requirements to be distributed according to requirements, thus potentially reducing cost complexity, and/or resource implications where desired.

Referring to FIGS. 4A-4C, there is depicted an example of how one embodiment of the present invention may augment not only a private entity but another entity positioned on the private object. More specifically, in this example, a set of drawers 400 in a room (not visible) is predefined to be a private entity, and a folded paper sign 410 is placed on top of the set of drawers. A predefined rule is defined in the embodiment that any objects positioned on the set of drawers are also to be considered private and thus should be augmented.

FIG. 4A depicts a frame from a captured video of the room wherein only the set of drawers 400 and folded paper sign 410 are shown. As illustrated in FIG. 4B, the boundary edge 420 of the set of drawers 400 and the boundary edge of 430 of the folded paper sign 410 are identified by a 3D edge detection algorithm.

Based on the identified boundary edges 420 and 430, an embodiment determines that the boundary edge 420 of the set of drawers 400 matches that which is expected for the set of drawers, and thus determines the private entity (i.e. the set of drawers 400) is present in the video frame, along with its location, orientation, size, shape, etc. values. The embodiment also determines that the positional relationship of the boundary edge 430 of the folded paper sign 410 with the private object. Here, the embodiment determines that the boundary edge 430 of the folded paper sign 410 is situated on the private object, and thus determines that the folded paper sign 410 is to also be augmented (in accordance with the predefined rule detailed above).

Based on the identified boundary edges 420 and 430, the graphical elements representing a simplified 3D model of the identified objects are then generated and used to replace the objects in the video, as illustrated in FIG. 4C. Thus, the set of drawers 400 and folded paper sign 410 are replaced by simple 3D models in the video. These simplified 3D models obfuscate the shape and/or details of the objects. In some embodiments, the simplified models may have differing visual characteristics so that they may be distinguished from each other in the modified video stream.

Figure 5B:
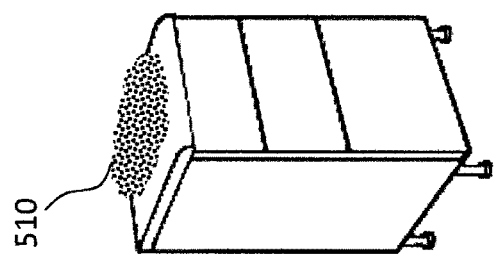
FIGS. 5A-5B illustrate how alternative embodiments may employ graphical elements or effects to obscure private entities in a video, in accordance with one or more aspects of the present invention.
Figure 5A:
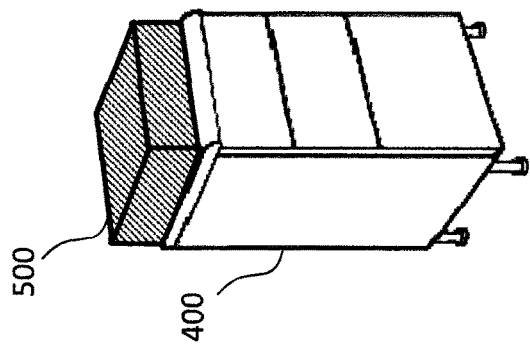

Referring now to FIGS. 5A-5B, it is illustrated that other embodiments may employ other graphical elements or effects to obscure private entities in a video.

For example, FIG. 5A demonstrates how the graphical element may comprise a mask 700 that covers a portion of the private entity (e.g. the set of drawers 400). The mask may, for example, comprise flat or smoothed surfaces which are matt or opaque in color so as to mask or hide details in the modified video.

FIG. 5B, on the other hand, demonstrates how the graphical element may comprise a blur effect 710 that blurs an object (e.g. the folded paper sign 410) positioned on top of the private entity (e.g. the set of drawers 400).

Figure 6:
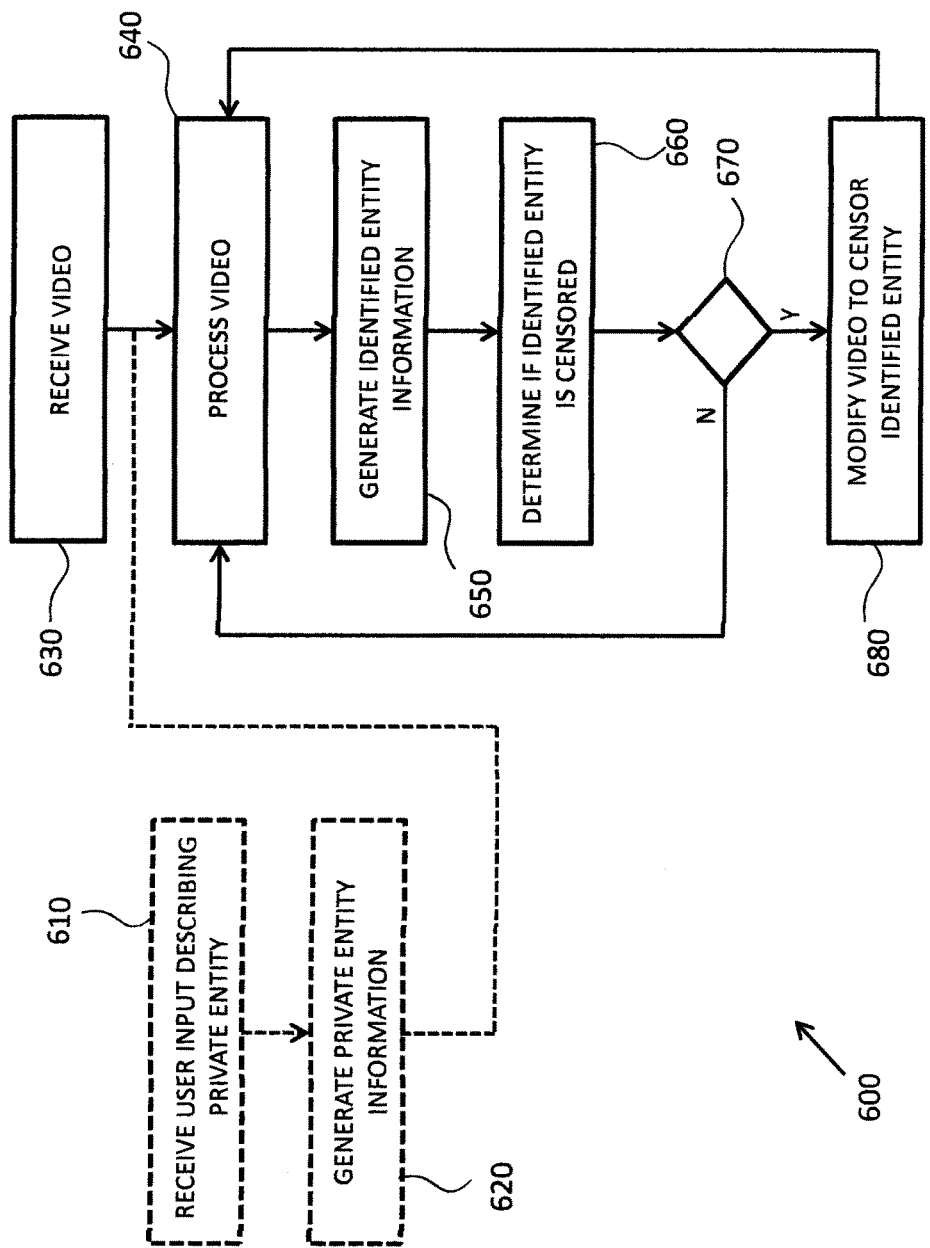
FIG. 6 is a flow diagram of a computer-implemented method, in accordance with one or more aspects of the present invention.

Referring to FIG. 6, an exemplary implementation of a computer-implemented method 600 according to an embodiment will now be described. The method may enable augmenting of a live video stream of an environment containing a private entity to be augmented.

The method comprises receiving 610 a user input describing the private entity to be augmented, and generating 620 private entity information based on the received user input. Steps 610 and 620 thus enable private entity information relating to the private entity to be defined by a user for subsequent use by the method. These may be described as being initial steps, because they enable the provision of private entity information for the purpose of determining the presence of a private entity in a video for example, and it is therefore likely that such steps may be undertaken first. Nonetheless, this need not be the case, and steps 610 and 620 may alternatively be undertaken at other times and/or repeated so as to provide new private entity information for example. Alternatively, and/or additionally, the steps 610 and 620 may not be undertaken at all, since (in some embodiments) private entity information may not be provided via a user input and may instead by predefined at creation or initialization of a method/system according to an embodiment. For this reason, the steps 610 and 620 are depicted with dashed lines in the flow diagram of FIG. 6.

In step 630, a live video stream of an environment is received. A portion (e.g. a frame, a section of a frame, multiple sequential frames, etc.) of the received video is then processed in step 640. More specifically, the received video is processed in accordance with an entity recognition algorithm to identify the presence of at least part of an entity in the environment.

Based on the result of the identification in step 640, identified entity information relating to at least one property of the identified entity is then generated in step 650.

Next, in step 660, it is determined if the identified entity is to be augmented based on the generated identified entity information and private entity information relating to the private entity. By way of example, step 660 of determining if the identified entity is to be augmented may comprise determining if the identified entity either substantially matches the private entity or is situated in, on, under or in close proximity to the private entity. If it is determined that the identified entity either substantially matches the private entity or is situated in, on, under or in close proximity to the private entity, the result of step 660 is that the identified entity it determined to be augmented.

The result of the determination is then analyzed (in step 670) to decide whether or not to proceed to step 680. If the identified entity is determined in step 660 not to be augmented, the method returns to step 640 wherein a next portion of the video is processed.

If, on the other hand, the identified entity is determined in step 660 to be augmented, the method proceeds to step 680 wherein the video stream is modified to replace at least a portion of the identified entity with a graphical element adapted to obscure the portion of the identified entity in the video. The graphical element used may, however, also depend on the result of the determination in step 660, e.g. whether it was determined that the identified entity substantially matches the private entity or is situated in, on, under or in close proximity to the private entity. In this way, differing graphical elements may be used to obscure, hide, or cover differing entities in the video stream for example.

A practical example of an embodiment being used in video augmenting may comprise a live video stream of an office being broadcast to multiple viewing locations, wherein an embodiment would continuously scan the live video stream for confidential files or anything placed on top of a desk of the office. The embodiment would then apply blurs and/or masks in real-time (in a similar fashion to other augmented reality systems).

In another practical example, a user may tour an environment while using a system according to one or more embodiments of the present invention, and mark/tag objects or areas in the 3D space that they do not wish unauthorized viewers to see. The system would then generate private entity information and rules from such user inputs, which can then be used during a live broadcast of the same environment. During the live broadcast, items in the view of the video would be identified, tracked, and compared against the private entity information. Where any of the items are determined to be private for example, a simplified 3D model (such as a colored cuboid) is rendered to cover the item in the video so that then item is obscured from view. Information used to scan and track the video may, for example, relate to global positioning information, local positioning information, room/environment plans, 3D map/models of the environment and/or objects, etc.

Those skilled in the art will note from the above description that, according to an embodiment of the present invention, a computer-implemented method of augmenting a video stream of an environment is provided, the environment containing a private entity to be augmented, the method comprising: processing the video stream of the environment in accordance with an entity recognition process or algorithm to identify the presence of at least part of an entity in the environment; generating identified entity information relating to at least one property of the identified entity; determining whether the identified entity is to be augmented based on the generated identified entity information and private entity information relating to the private entity; and if the identified entity is determined to be augmented, modifying the video stream to replace at least a portion of the identified entity with a graphical element adapted to obscure the portion of the identified entity in the video stream.

Disclosed is a concept of augmenting a video stream of an environment containing private or confidential information so that the video stream can be viewed by a person situated remotely from the environment while maintaining the privacy or confidentiality of the information in the viewed video. By enabling a private entity to be identified in an environment, video of the environment may then be processed to identify if the video contains an entity to be augmented (such as the private entity itself or an entity having a predetermined special relationship with the private entity). The video may then be altered so as to prevent the identified entity(ies) from being viewed by a viewer of the video. For example, the identified entity(ies) may be blurred, masked out, blocked, or replaced by a differing image, so that the video does not display the relevant private, sensitive or confidential information.

In particular, it is disclosed to determine if an entity identified in a video stream of environment is to be augmented based on information relating to the identified entity and information relating to a private entity of the environment, and then to modify the video stream to replace (at least a portion of) the identified entity with a graphical element which obscures (at least a portion of) the identified entity so as to prevent the display of the identified entity and/or the sensitive/private information it may comprise. By employing various types of information relating to the private entity, for example, embodiments may accommodate changes in the environments and/or the private entity while still maintaining privacy/confidentiality.

It is also noted that, by leveraging predefined information about a private entity to be augmented along with information from a video stream, the video stream may be processed and modified in real-time so that it can be broadcast in a live manner to one or more remote viewers without compromising (e.g. exposing or making visible/viewable) private or confidential content in the videoed environment.

Modification of the video stream may depend on a viewer's viewing privileges and/or security credentials for example. Embodiments may therefore enable video to be captured and broadcast to remote users and, depending on a viewer's authentication privileges or trustworthiness, certain private information in the environment may be selectively displayed or obscured in the viewed video.

Embodiments may also enable the implementation of privacy zones or areas within an environment for use in augmented reality systems/methods.

Furthermore, many different ways to process a video stream and/or to identify and track an entity in a video stream may be employed by embodiments, some of which are already widely known and employed in virtual reality and augmented reality systems. Accordingly, technical requirements for embodiments may already be known and widely available, thus enabling embodiments to be implemented relatively easily and/or cheaply.

Embodiments may further comprise: receiving a user input describing the private entity to be augmented; and generating the private entity information based on the received user input. Such embodiments may therefore enable a user to tag items, objects, regions or entities within the environment that they wish to keep private or confidential. The user input information may then be used to generate information and rules about the private/confidential object, regions or entities, thereby enabling their identification and augmentation in a video stream of the environment. This may provide a high degree of flexibility and also accommodate changes in the environment.

The private entity information may comprise at least one of: private entity location information representative of a location of the private entity; private entity orientation information representative of an orientation of the private entity; private entity geometric information representative of at least one geometric property of the private entity; private entity color information representative of at least one color of the private entity; and private entity 3D coordinate information representative of a position of the private entity in a 3D coordinate space. Thus, the private object or entity in an environment may be described using a wide variety of information which enables a high degree of flexibility or accuracy in determining the presence of the private object/entity in a video stream of the environment.

The identified entity information may comprise at least one of: viewing direction information representative of a viewing direction of a video capture device adapted to capture the video; viewing position information representative of a position of the video capture device; identified entity location information representative of a location of the identified entity; identified entity orientation information representative of an orientation of the identified entity; identified entity geometric information representative of at least one geometric property of the identified entity; identified entity color information representative of at least one color of the identified entity; and identified entity 3D coordinate information representative of a position of the identified entity in a 3D coordinate space. Thus, an object or entity that is identified in an environment may be described using a wide variety of information which enables a high degree of flexibility or accuracy in determining the presence of the private object/entity in a video of the environment.

The step of determining if the identified entity is to be augmented may comprise: determining if the identified entity either substantially matches the private entity or is situated in, on, under or in close proximity to the private entity. If it is determined that the identified entity either substantially matches the private entity or is situated in, on, under or in close proximity to the private entity, it may be determined that the identified entity is to be augmented. Embodiments may therefore enable the concept of augmenting not only items that are predefined to be private, but also to augmenting items that are positioned with a predetermined relationship with a private entity (e.g. placed in, on, under, close-by, next-to, adjacent to, or proximate to private objects/items). For instance, a table may be defined as being a private table and any items placed on the upper surface of the table may be treated as being private/confidential and thus augmented in a video stream. In this way, embodiments may provide a great deal of flexibility when enabling the definition of what is private/confidential in an environment. Such flexibility may, for example, enable a person in an environment to simply place any items considered confidential on a predefined private entity in order to have it augmented in a video. Complex and/or time consuming interaction with a video stream capture system in order to specify private/confidential items/objects in the environment may therefore be avoided.

In some embodiments, the step of modifying the video stream may comprise generating the graphical element based on whether it is determined that the identified entity substantially matches the private entity or is situated in, on, under or in close proximity to the private entity. Different augmented items/objects may therefore be distinguished from each other in the modified video stream, for example by obscuring the items/objects with graphical elements of differing color or graphical effects.

Also, the step of modifying the video stream may comprise generating the graphical element such that it is representative of a simplified 3D model of the identified entity. For example, identified entities may be replaced by simple 3D models, such as cubes or boxes that obfuscate details of the entities. Such models may have flat surfaces of a single opaque color in order to mask or hide details of the entities being augmented (e.g. hidden or obscured from view in the video).

In an embodiment, the step of determining if the identified entity is to be augmented may comprise: determining a viewing privilege or access right of a target viewer of the video stream; and determining the identified entity is to be augmented if the viewing privilege or access right of the target viewer does not meet a predetermined requirement. In this way, the display of private items or information in a videoed environment may be controlled so that only trusted parties (e.g. remotely located viewers) are able to see the private items/information in a video of the environment. Conversely, untrusted parties (e.g. unidentified public viewers or unknown $3^{rd}$-parties) would only be able to view modified (e.g. augmented) video wherein the private/confidential items are rendered (for example, using replacement graphical elements or effect) so that they are obscured from view.

In embodiments, the graphical element may comprise a masked or blurred version of the portion of the identified entity. Entities that are identified to be private or confidential may thus be blurred or masked from view using simple graphic processing/rendering techniques that may be implemented in real-time and/or with little processing/rendering overhead.

The modified video stream may be displayed to a person remotely located from the environment. For example, embodiments may be adapted to generate the modified (e.g. augmented) video stream before communicating or broadcast the modified video to one or more $3^{rd}$-party viewers. Conversely, the captured video may first be communicated or broadcast to one or more video playback devices, wherein the video playback device(s) modify the received video in accordance with proposed embodiments so that a modified (e.g. augmented) version of video stream is displayed to an untrusted viewer.

According to another embodiment of the present invention, a computer program product is provided for augmenting a video stream of an environment, the environment containing a private entity to be augmented, the computer program product comprising a computer readable storage medium having program instructions embodied therewith, the program instructions executable by a processing unit to cause the processing unit to perform a method comprising: processing the video stream of the environment in accordance with an entity recognition process or algorithm to identify the presence of at least part of an entity in the environment; generating identified entity information relating to at least one property of the identified entity; determining if the identified entity is to be augmented based on the generated identified entity information and private entity information relating to the private entity; and if the identified entity is determined to be augmented, modifying the video stream to replace at least a portion of the identified entity with a graphical element adapted to obscure the portion of the identified entity in the video stream.

According to another embodiment of the present invention, an augmentation system is provided for augmenting a video stream of an environment, the environment containing a private entity to be augmented, the system comprising: a video processing unit adapted to process the video stream of the environment in accordance with an entity recognition algorithm to identify the presence of at least part of an entity in the environment; an information generator adapted to generate identified entity information relating to at least one property of the identified entity; a processing unit adapted to determine if the identified entity is to be augmented based on the generated identified entity information and private entity information relating to the private entity; and a video modification unit adapted to, if the identified entity is determined to be augmented, modify the video stream to replace at least a portion of the identified entity with a graphical element adapted to obscure the portion of the identified entity in the video stream.

In one or more embodiments, a system is disclosed which can automatically and dynamically augment a live video stream of an environment containing private or confidential information. The system may process a video stream and modify the video stream, in real time, so as to provide a modified (e.g. augmented) video stream wherein confidential objects or entities of the environment which are present in the video stream are replaced or obscured by graphical element or effect, thereby preventing a viewer of the modified video stream from viewing the confidential information. For example, the system may track the position of a private object or entity in a video stream so that it remains blurred or masked at all times that it is within the video's view. A proposed embodiment of a system may therefore augment a video stream in real-time so as to avoid unnecessary time delays caused by extensive and/or conventional post-processing of the video stream prior to be transmitted or broadcast.

Embodiments may further comprise a user input interface adapted to receive a user input describing the private entity to be augmented. Also, the information generator may be further adapted to generate the private entity information based on the received user input. A user may therefore define (e.g. tag, describe, label, etc.) objects, regions or entities within the environment that are to be augmented in a video of the environment. The input from the user may then be used to generate information and rules about such user-defined regions or entities, thereby enabling their identification and augmentation in a video stream of the environment. This may provide a high degree of flexibility for a user and also accommodate changes in the environment.

In an embodiment, the processing unit may be further adapted to determine if the identified entity either substantially matches the private entity or is situated in, on, under or in close proximity to the private entity. If it is determined that the identified entity either substantially matches the private entity or is situated in, on, under or in close proximity to the private entity, it may be determined that the identified entity is to be augmented. Thus, there may be proposed a concept for augmenting not only items that are predefined to be private, but also augmenting items that are placed in, on, under, close-by, next-to, adjacent to, or proximate to a private object/item. In this way, embodiments may provide a great deal of flexibility when enabling the definition of what is private/confidential in an environment. Such flexibility may, for example, enable a person in an environment to simply place any items considered confidential on or in a predefined private entity in order to have it augmented from a video. This may help to avoid complicated and/or time consuming interaction with a video capture system in order to specify items or objects to be augmented in a videoed environment.

Also, in one embodiment, the video modification unit may be adapted to generate the graphical element based on whether the processing unit determines that the identified entity substantially matches the private entity or is situated in, on, under or in close proximity to the private entity. In this way, differing augmented items/objects/areas may therefore be distinguished from each other in the modified video stream. For example, differing graphical elements or effects may be applied to differing augmented items in a video.

The video modification unit may be adapted to generate the graphical element such that it is representative of a simplified 3D model of the identified entity. Identified entities may be replaced by simple 3D models, such as cubes, prisms or boxes that obfuscate the shape and/or details of the entities. The simplified models may have flat or smoothed surfaces and may be matt or opaque in color so as to mask or hide details in the modified video.

For example, the graphical element may comprise a masked or blurred version of the portion of the identified entity. Simple graphic or video processing and rendering techniques may therefore be used in order to augment private objects/items in a modified video according to an embodiment.

Embodiments comprising aspects of the present invention may be employed in video capture systems, and may be of particular use in virtual reality systems and/or augmented reality systems, such as Hololens®, virtual reality headsets, head-mounted display systems, Oculus Rift® systems, and the like. For instance, such systems may be adapted to capture a video of an environment containing a private object or entity and then augment the video (for instance, by obscuring a portion of the video that would otherwise display the private object/entity) prior to displaying the video to a viewer.

One or more embodiments may also be employed in video display systems that are adapted to display video captured of an environment. Such video may be captured using a conventional image or video capture device and this may then be supplemented using a system or method according to an embodiment so as to process the captured video and modify it to augment private/confidential information from the video before it is displayed to a viewer. Thus, embodiments may be implemented at a location that is different or remote from the videoed environment, such as in a video processing system and/or video display system of a viewer.

Figure 7:
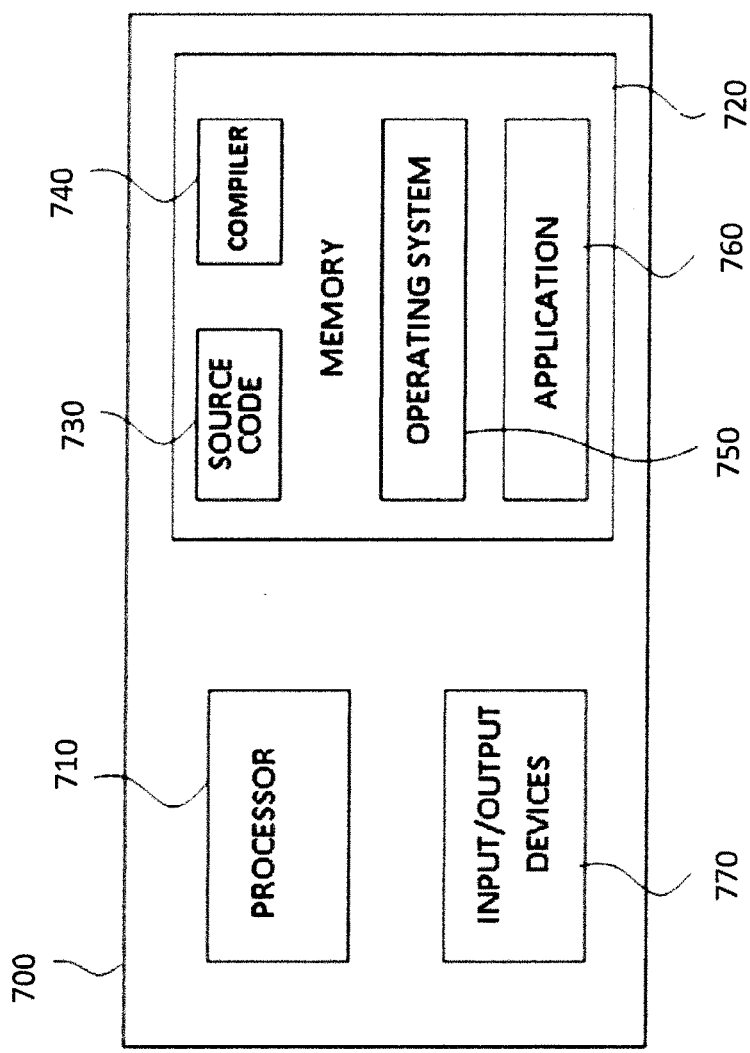
FIG. 7 illustrates an example of a computer device within which one or more aspects of an embodiment of the present invention may be employed.

FIG. 7 illustrates an example of a computer 700 within which one or more parts of an embodiment may be employed. Various operations discussed above may utilize the capabilities of the computer 700. For example, one or more parts of a system for augmenting video may be incorporated in any element, module, application, and/or component discussed herein.

The computer 700 may include, but not be limited to, a PC, workstation, laptop, PDA, palm device, smartphone, image capture device, video capture device, internet-enabled display, server, storage, and the like. Generally, in terms of hardware architecture, the computer 700 may include one or more processors 710, memory 720, and one or more I/O devices 770 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in the memory 720. The processor 710 can be virtually any custom made or commercially available processor, a central processing unit (CPU), a digital signal processor (DSP), or an auxiliary processor among several processors associated with the computer 700, and the processor 710 may be a semiconductor based microprocessor (in the form of a microchip) or a microprocessor.

The memory 720 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 720 may incorporate electronic, magnetic, optical, and/or other types of storage media. Note that the memory 720 can have a distributed architecture, where various components are situated remote from one another, but can be accessed by the processor 710.

The software in the memory 720 may include one or more separate programs, each of which comprises an ordered listing of executable instructions for implementing logical functions. The software in the memory 720 includes a suitable operating system (O/S) 750, compiler 740, source code 730, and one or more applications 760 in accordance with exemplary embodiments. As illustrated, the application 760 comprises numerous functional components for implementing the features and operations of the exemplary embodiments. The application 760 of the computer 700 may represent various applications, computational units, logic, functional units, processes, operations, virtual entities, and/or modules in accordance with exemplary embodiments, but the application 760 is not meant to be a limitation.

The operating system 750 controls the execution of other computer programs, and provides scheduling, input-output control, file and data management, memory management, and communication control and related services. It is contemplated by the inventors that the application 760 for implementing exemplary embodiments may be applicable on all commercially available operating systems.

Application 760 may be a source program, executable program (object code), script, or any other entity comprising a set of instructions to be performed. When a source program, then the program is usually translated via a compiler (such as the compiler 740), assembler, interpreter, or the like, which may or may not be included within the memory 720, so as to operate properly in connection with the O/S 750. The I/O devices 770 may include input devices such as, for example but not limited to, a mouse, keyboard, scanner, microphone, camera, etc. Furthermore, the I/O devices 770 may also include output devices, for example but not limited to a printer, display, etc. Finally, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 also include components for communicating over various networks, such as the Internet or intranet.

If the computer 700 is a PC, workstation, intelligent device or the like, the software in the memory 720 may further include a basic input output system (BIOS) (omitted for simplicity). The BIOS is a set of essential software routines that initialize and test hardware at startup, start the O/S 750, and support the transfer of data among the hardware devices. The BIOS is stored in some type of read-only-memory, such as ROM, PROM, EPROM, EEPROM or the like, so that the BIOS can be executed when the computer 700 is activated.

When the computer 700 is in operation, the processor 710 is configured to execute software stored within the memory 720, to communicate data to and from the memory 720, and to generally control operations of the computer 700 pursuant to the software. The application 760 and the O/S 750 are read, in whole or in part, by the processor 710, perhaps buffered within the processor 710, and then executed.

When the application 760 is implemented in software it should be noted that the application 760 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 760 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of providing a live video stream of a real environment, the method comprising:
    predefining a private entity and storing private entity information relating to the private entity;
    processing in real-time the live video stream of the real environment for communication to a potentially untrusted third-party remotely located from the real environment, the processing comprising:
        evaluating the video stream in accordance with an entity recognition process to identify presence of at least part of an entity in the environment;
        generating identified entity information relating to at least one property of the identified entity;
        determining whether the identified entity substantially matches the private entity based on the generated identified entity information and the private entity information relating to the private entity; and
        based on determining that the identified entity substantially matches the private entity, modifying the video stream to replace an imaged entity in, on, or under the identified entity within the live video stream with a graphical element adapted to obscure the imaged entity in the video stream, the modifying providing in real-time a modified live video stream of the real environment with the graphical element incorporated therein; and
    providing the modified live video stream for display to the potentially un-trusted third-party located remotely from the environment.

2. The method of claim 1, wherein the predefining comprises:

receiving a user input describing the private entity to be augmented; and generating the private entity information based on the received user input.

3. The method of claim 1, wherein the private entity information comprises at least one of:
    private entity location information representative of a location of the private entity;
    private entity orientation information representative of an orientation of the private entity;
    private entity geometric information representative of at least one geometric property of the private entity;
    private entity color information representative of at least one color of the private entity; and
    private entity 3D coordinate information representative of a position of the private entity in a 3D coordinate space.

4. The method of claim 1, wherein the identified entity information comprises at least one of:
    viewing direction information representative of a viewing direction of a video capture device adapted to capture the video stream;
    viewing position information representative of a position of the video capture device;
    identified entity location information representative of a location of the identified entity;
    identified entity orientation information representative of an orientation of the identified entity;
    identified entity geometric information representative of at least one geometric property of the identified entity;
    identified entity color information representative of at least one color of the identified entity; and
    identified entity 3D coordinate information representative of a position of the identified entity in a 3D coordinate space.

5. The method of claim 1, wherein modifying the video stream comprises generating the graphical element such that it is representative of a simplified 3D model of the imaged entity.

6. The method of claim 1, wherein the graphical element comprises a masked or blurred version of the portion of the imaged entity.

7. The method of claim 1, further comprising determining whether the imaged entity is to be augmented by:
    determining a viewing privilege or access right of a target viewer of the video stream; and
    determining that the imaged entity is to be augmented where the viewing privilege or access right of the target viewer does not meet a predetermined requirement.

8. The method of claim 1, further comprising displaying the modified video stream to a person remotely located from the environment.

9. A computer program product for providing a live video stream of a real environment, the computer program product comprising:
    a computer readable storage medium having program instructions embodied therewith, the program instructions being executable by a processing unit to cause the processing unit to perform a method comprising:
        predefining a private entity and storing private entity information relating to the private entity;
        processing in real-time the live video stream of the real environment for communication to a potentially un-trusted third-party remotely located from the real environment, the processing comprising:
            evaluating the video stream in accordance with an entity recognition process to identify presence of at least part of an entity in the environment;
            generating identified entity information relating to at least one property of the identified entity;
            determining whether the identified entity substantially matches the private entity based on the generated identified entity information and the private entity information relating to the private entity; and
            based on determining that the identified entity substantially matches the private entity, modifying the video stream to replace an imaged entity in, on, or under the identified entity within the live video stream with a graphical element adapted to obscure the imaged entity in the video stream, the modifying providing in real-time a modified live video stream of the real environment with the graphical element incorporated therein; and
        providing the modified live video stream for display to the potentially un-trusted third-party located remotely from the environment.

10. A system for providing a live video stream of a real environment, the system comprising:
    a memory; and
    a processor communicatively coupled to the memory, the system performing a method comprising:
        predefining a private entity and storing private entity information relating to the private entity;
        processing in real-time the live video stream of the real environment for communication to a potentially un-trusted third-party remotely located from the real environment, the processing comprising:
            evaluating the video stream in accordance with an entity recognition process to identify presence of at least part of an entity in the environment;
            generating identified entity information relating to at least one property of the identified entity;
            determining whether the identified entity substantially matches the private entity based on the generated identified entity information and the private entity information relating to the private entity; and
            based on determining that the identified entity substantially matches the private entity, modifying the video stream to replace an imaged entity in, on, or under the identified entity within the live video stream with a graphical element adapted to obscure the imaged entity in the video stream, the modifying providing in real-time a modified live video stream of the real environment with the graphical element incorporated therein; and
        providing the modified live video stream for display to the potentially un-trusted third-party located remotely from the environment.

11. The system of claim 10, wherein the predefining further comprises:
    receiving a user input describing the private entity to be augmented, and generating the private entity information based on the received user input.

12. The system of claim 10, wherein the private entity information comprises at least one of:
    private entity location information representative of a location of the private entity;
    private entity orientation information representative of an orientation of the private entity;
    private entity geometric information representative of at least one geometric property of the private entity;
    private entity color information representative of at least one color of the private entity; and private entity 3D coordinate information representative of a position of the private entity in a 3D coordinate space.

13. The system of claim 10, wherein the identified entity information comprises at least one of:
    viewing direction information representative of a viewing direction of a video capture device adapted to capture the video stream;
    viewing position information representative of a position of the video capture device;
    identified entity location information representative of a location of the identified entity;
    identified entity orientation information representative of an orientation of the identified entity;
    identified entity geometric information representative of at least one geometric property of the identified entity;
    identified entity color information representative of at least one color of the identified entity; and
    identified entity 3D coordinate information representative of a position of the identified entity in a 3D coordinate space.

14. The system of claim 10, wherein modifying the video stream comprises generating the graphical element such that it is representative of a simplified 3D model of the imaged entity.

15. The system of claim 10, wherein the graphical element comprises a masked or blurred version of the portion of the imaged entity.

* * * * *